United States Patent [19]

Ueoka et al.

[11] Patent Number: 5,002,218
[45] Date of Patent: Mar. 26, 1991

[54] METHOD OF JOINING CERAMICS AND METAL

[75] Inventors: Toshitsugu Ueoka, Hiroshima; Akihide Takami, Hatsukaichi, both of Japan

[73] Assignee: Mazda Motor Corporation, Hiroshima, Japan

[21] Appl. No.: 479,705

[22] Filed: Feb. 15, 1990

[30] Foreign Application Priority Data

Feb. 15, 1989 [JP] Japan .................................. 1-35747

[51] Int. Cl.⁵ ...................... B23K 1/19; B23K 103/16
[52] U.S. Cl. .................................. 228/121; 228/122; 228/124; 228/263.12; 428/627; 51/307
[58] Field of Search ........... 228/121, 122, 124, 263.12, 228/220, 232, 233; 428/621, 622, 627; 51/307

[56] References Cited

U.S. PATENT DOCUMENTS

| | | | |
|---|---|---|---|
| 4,471,026 | 9/1984 | Nicholas et al. | 228/121 |
| 4,762,269 | 8/1988 | Gyarmati et al. | 228/263.12 |
| 4,784,313 | 11/1988 | Godziemba-Maliszewski | 228/124 |
| 4,797,328 | 1/1989 | Boehm et al. | 428/621 |
| 4,871,108 | 10/1989 | Boecker et al. | 228/122 |

FOREIGN PATENT DOCUMENTS 60-81071  5/1985  Japan .

*Primary Examiner*—Sam Heinrich
*Attorney, Agent, or Firm*—Fleit, Jacobson, Cohn, Price, Holman & Stern

[57] ABSTRACT

Two different members, such as a silicon nitride member and a carbide alloy member or a metal member, is attached with a joining member interposed therebetween and is heated at a preselected temperature higher than approximately 1,000° C. under a vacuum or in a reducing atmosphere to be joined together as an integral member. The joining member in the form of a thin layer is made up of a material consisting of a gold-copper (Au-Cu) alloy and titanium (Ti) having a content of 1 to 30, desirably 10 to 30, weight percent of the joining layer.

31 Claims, 6 Drawing Sheets

METHOD OF JOINING CERAMICS AND METAL

FIELD OF THE INVENTION

The present invention relates to a method of joining ceramics, such as silicon nitride, and metal as an integral structural member, and more particularly to a method of providing a high joining strength between joined together silicon and metal.

BACKGROUND OF THE INVENTION

In recent years, fine ceramic materials, such as silicon nitride ($Si_3N_4$) and silicon carbide have become increasingly practical in use as structural materials for high temperature-resistant applications or machine tools for their high strength and abrasion resistance in a wide range of high temperatures and their chemical stability. It is, however, an obstacle to a wide range of applications that these ceramic materials have the drawback of brittleness.

A number of attempts have been heretofore made to overcome the drawbacks of brittleness of the ceramic. One approach made successfully is to join a member of ceramic to a member of metal to form a ceramic-metal compound member. To improve such a ceramic-metal compound member, methods of providing strong joining strength between the pieces of ceramic and metal are now expected.

One approach to the drawbacks is to use a joining sheet which has a layer of brazing material and a layer of active metal, such as titanium, laminated on at least one surface of the brazing material layer. The joining sheet is put between a ceramic member and a metal member with the active metal layer in contact with a surface of the metal member and heat-treated to join the ceramic and metal materials together. Such a joining sheet is known from, for example, Japanese Unexamined Patent Publication No. 60(1985)-81071 entitled "Ceramics Joining Metal Sheet", laid open May 9, 1985.

A compound member of ceramic and metal members joined together by the use of the joining metal sheet described in the publication has a joining strength, at most about 35 to 40 kg/mm$^2$ in a four-point bending test, which joining strength is not always sufficient to use the compound member in a wide range of applications.

SUMMARY OF THE INVENTION

It is, therefore, a primary object of the present invention to provide a method of joining ceramic, in particular silicon nitride, and metal members together, which method provides a sufficiently strong joining strength between the two members.

To achieve the above object, the present invention provides a method of heat-joining a silicon nitride member and carbide alloy member having a content of more than 5 weight-percent of cobalt (Co) with a joining layer interposed between the silicon nitride and carbide alloy members.

The joining layer is made up of a material consisting of a gold-copper (Au-Cu) alloy and titanium (Ti) having a content of 1 to 30, desirably 10, weight percent of the joining layer.

Alternatively, the joining layer is made up of a material consisting of a gold-copper (Au-Cu) alloy and cobalt (Co) having a content of 5 to 20, desirably 7 to 20, weight percent of the joining layer in addition to titanium (Ti) having a content of 1 to 30, desirably 10 to 20, weight percent of the joining layer. If at least either one of the members to be joined has a content of a sufficient weight percent of cobalt (Co), the joining layer does not necessarily need to contain cobalt (Co).

The silicon nitride and metal members closely attached to each other with the joining layer interposed therebetween is heated at a melting temperature of the gold-copper (Au-Cu) alloy under a vacuum of about $10^{-2}$ to $10^{-5}$ Torr or in a reducing atmosphere, such as a $H_2$ gas, for a predetermined period of time. As a result of the heating, the gold-copper (Au-Cu) alloy melts and the titanium (Ti) and cobalt (Co) dissolve in the molten gold-copper (Au-Cu) alloy. The titanium (Ti) and cobalt (Co) are distributed over the surface of the silicon nitride member and react with silicon nitride to form intermetallic compounds, such as a Si-Co compound and Si-Ti-Co compound as well as a Ti-Si compound, on the surface. These intermetallic compounds and cobalt (Co) in particular, considerably increase the joining strength between the silicone nitride and metal members.

BRIEF DESCRIPTION OF THE DRAWINGS

The above and other objects and features of the present invention will be apparent to those skilled in the art from the following description of preferred embodiments thereof when taken in conjunction with the accompanying drawings, wherein.

DETAILED DESCRIPTION OF THE PREFERRED EMBODIMENT

Figure 1:
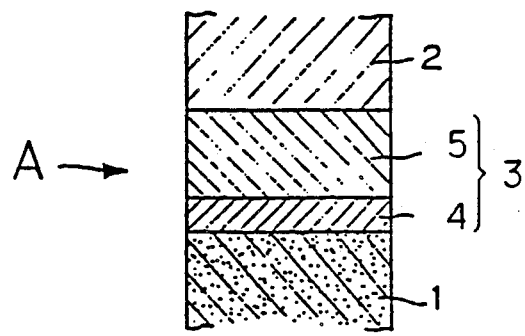
FIG. 1 is an illustration showing a fragmentary cross section of an integral structural member joined in a method according to the present invention.

Referring to FIG. 1, there is shown a cross-sectional structure of an integral structural member A which comprises a sintered silicon nitride ($Si_3N_4$) block 1 and a carbide alloy block 2 joined together in the method in accordance with a preferred embodiment of the present invention. The different two blocks 1 and 2 are joined together with a joining layer 3 put therebetween. The joining layer 3 is made up of two considerably thinner layers 4 and 5 of different metal materials than both the blocks 1 and 2. The two blocks 1 and 2 are, after attached with the thin joining layer, heated under various temperature conditions in a vacuum.

EXAMPLE I

The carbide alloy block 2 having a compound of 92.5 weight percent carbon tungsten (WC) and 7.5 weight percent cobalt (Co) is attached to the sintered silicon block 1 with the thin joining layer 3 between the blocks 1 and 2. The joining layer 3 consists of a titanium (Ti) film 4 of 20 $\mu$m thickness and a metal layer 5 of a gold-copper (Au-Cu) alloy having a compound of 50 weight percent gold (Au) and 50 weight percent copper. The ratio of the weight of the titanium (Ti) used for the joining layer 3 to the total weight of the titanium (Ti) and the gold-copper (Au-Cu) alloy is approximately 10 percent.

Figure 2:
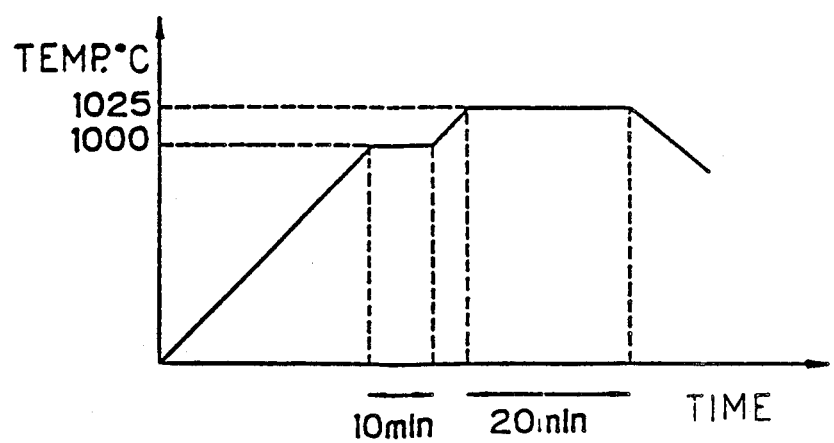
FIG. 2 is a diagram showing a heating schedule according to a preferred embodiment of the present invention.

To form the integral structural member A, the attached blocks 1 and 2 with the joining layer 3 interposed therebetween was applied with a longitudinal compressive load of a maximum 200 g/cm² to avoid flotation of the joining layer 3 and then heated at 1025° C. under a vacuum of $10^{-3}$ Torr, for 20 minutes, after being preheated at 1000° C. for 10 minutes, on a heating schedule as shown in FIG. 2. Thereafter, it is allowed to cool down to ambient temperature.

Figure 3:
FIG. 3 is a diagram showing a distribution of titanium and cobalt resulting from the heating schedule of FIG. 2 according to an EPMA line analysis.

The joining strength of the integral structural member A was verified by a four point bending test defined under Japanese Industrial Standard (JIS) 1601. The four point bending test was made by loading a test piece of the integral structure member A thus formed which was dimensioned 3×4×37 mm. As the result of the four point bending test, the complex structural member A exhibited a joining strength of 62 kg/mm². Additionally, the result of EPMA line analysis was as shown in FIG. 3. As is obvious from FIG. 3, cobalt (Co) and titanium (Ti) were somewhat unevenly distributed on the surfaces of the sintered silicon block 1 and the carbide alloy block 2.

Figure 4:
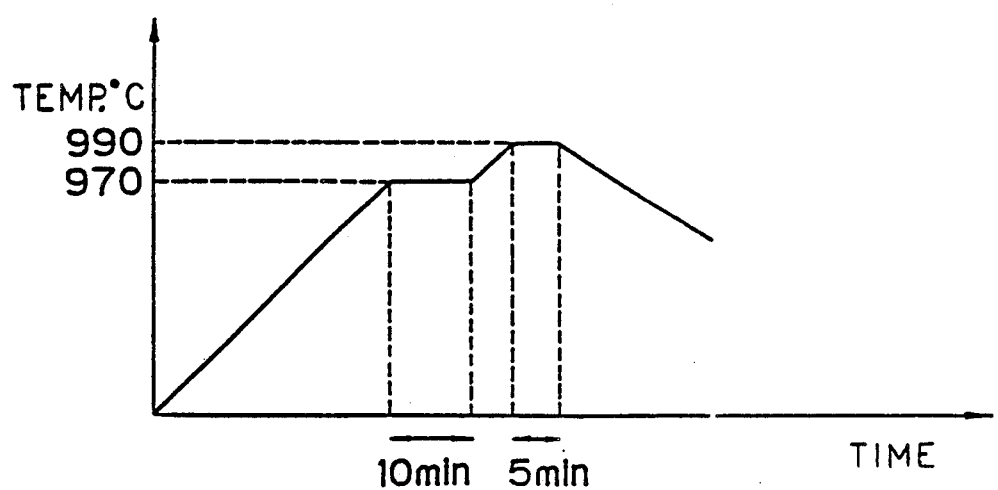
FIG. 4 is a diagram showing a heating schedule taken to compare a distribution of titanium resulting therefrom with the distribution of titanium resulting from the heating schedule of FIG. 2.
Figure 5:
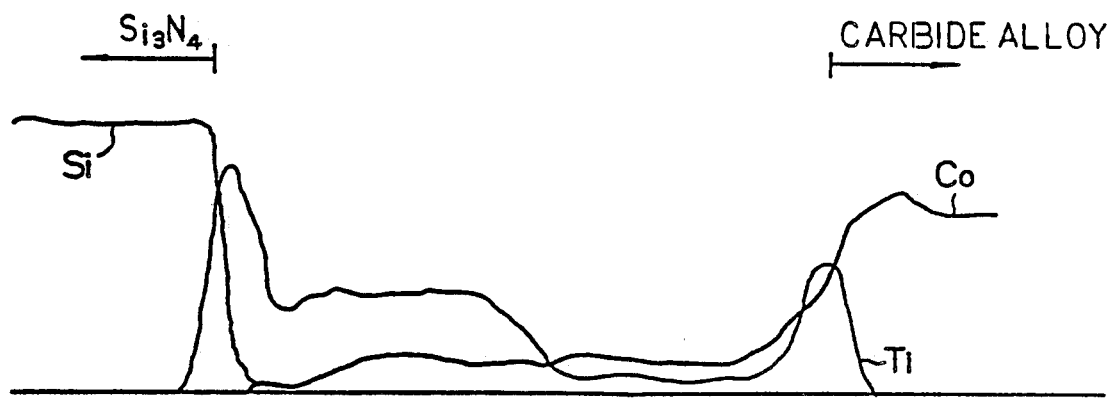
FIG. 5 is a diagram showing the distribution of titanium and cobalt resulting in the heating schedule of FIG. 4 according to the EPMA line analysis.

The integral structural member A was otherwise formed by heating the attached blocks 1 and 2 with the joining layer 3 interposed therebetween, under a vacuum of $10^{-3}$ Torr at 990° C. for 5 minutes, after being preheated at 970° C. for 10 minutes on a time schedule as shown in FIG. 4. Thereafter, it is allowed to cool down to ambient temperature. As the result of the four point bending test, the integral structure member A exhibited a joining strength of 47 kg/mm² EPMA line analysis, however, exhibited the result that cobalt (Co) was substantially evenly distributed on the surfaces of the sintered silicon block 1 and the carbide alloy block 2 as apparently shown in FIG. 5.

The joining layer 3 may be made up of a layer of silver brazing material consisting of, for example, 75 weight percent silver (Ag), 23 weight percent copper (Cu) and 2 weight percent titanium (Ti). The attached blocks 1 and 2 with the silver brazing layer 3 put therebetween was heated, under a vacuum of $10^{-3}$ Torr, at 830° C. for 10 minutes, after being preheated at 810° C. for 10 minutes. Thereafter, it is allowed to cool down to ambient temperature.

Figure 6:
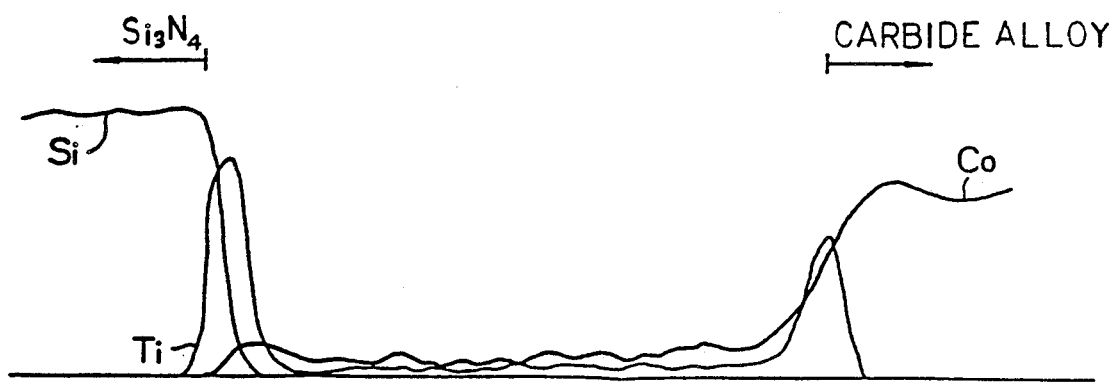
FIG. 6 is a diagram showing a distribution of titanium and cobalt resulting from another heating schedule taken to be compared with the distribution of titanium resulting from the heating schedule of FIG. 2.

As the result of the four point bending test, the integral structural member A exhibited a joining strength of 41 kg/mm². The result of EPMA line analysis was as shown in FIG. 6. As is obvious from FIG. 6, an uneven distribution of cobalt (Co) was little observed on the surfaces of the sintered silicon block 1 and the carbide alloy block 2.

EXAMPLE II

Figure 7:
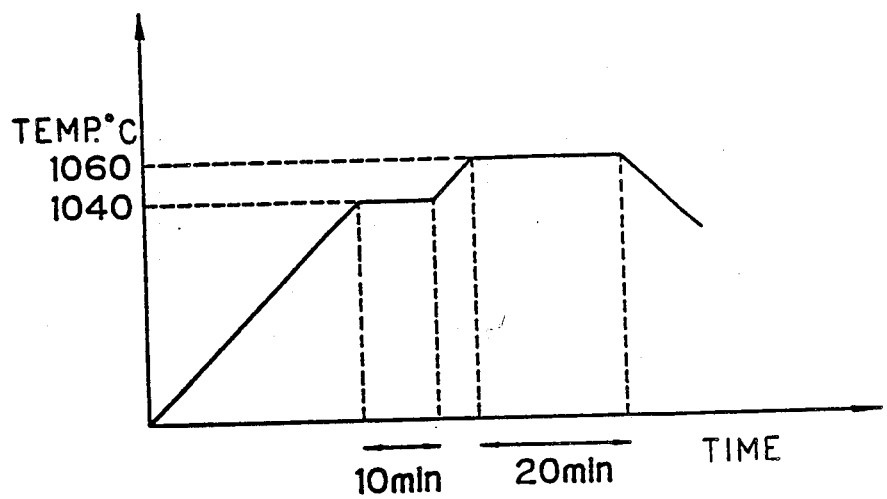
FIG. 7 is a diagram showing a heating schedule according to another preferred embodiment of the present invention.

The carbide alloy block 2 having a compound of 90 weight percent carbon tungsten (WC) and 10 weight percent cobalt (Co) is attached to the sintered silicon block 1 with the thin joining layer 3 put between the blocks 1 and 2. The joining layer 3 consists of a titanium (Ti) film 4 of 40 $\mu$m thickness and a metal layer 5 of a gold-copper (Au-Cu) alloy of 50 $\mu$m thickness which has a compound of 35 weight percent gold (Au) and 65 weight percent copper. The ratio of the titanium (Ti) used for the joining layer 3 to the total amount of the titanium (Ti) and the gold-copper (Au-Cu) alloy is approximately 20 weight percent. To form the integral structural member A, the attached blocks 1 and 2 with the joining layer 3 interposed therebetween was heated, under a vacuum of $10^{-3}$ Torr, at 1060° C. for 20 minutes, after being preheated at 1040° C. for 10 minutes, on a time schedule as shown in FIG. 7. Thereafter, it is allowed to cool down to ambient temperature.

Figure 8:
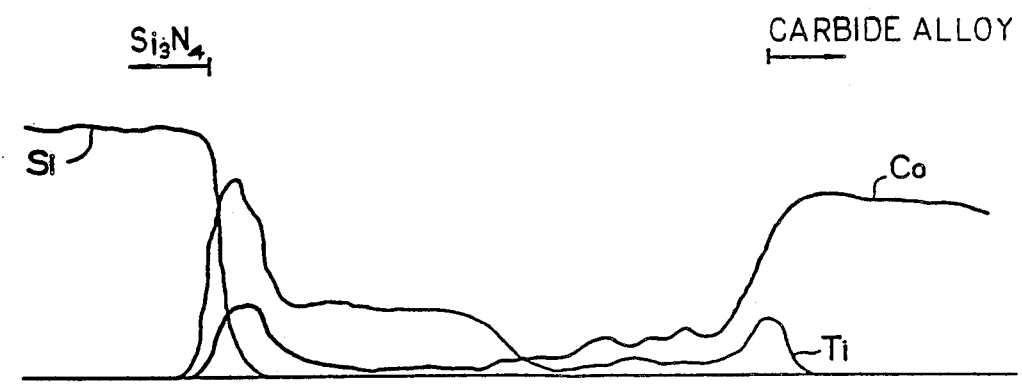
FIG. 8 is a diagram showing a distribution of titanium and cobalt resulting from the heating schedule of FIG. 7 according to an EPMA line analysis.

The joining strength of the integral structural member A was verified in the same manner as described in EXAMPLE I and was 56 kg/mm². The result of EPMA line analysis, as shown in FIG. 8, indicated that cobalt (Co) was somewhat unevenly distributed on the surfaces of the sintered silicon block 1 and the carbide alloy block 2.

These results indicate that the distribution of cobalt (Co) over the surface of the sintered silicon block 1 considerably increases the joining strength of the integral structural member A and that a sufficient distribution of cobalt (Co) over the surface of the sintered silicon block 1 is achieved by heating the integral structural member A for, desirably, more than 20 minutes.

Figure 9:
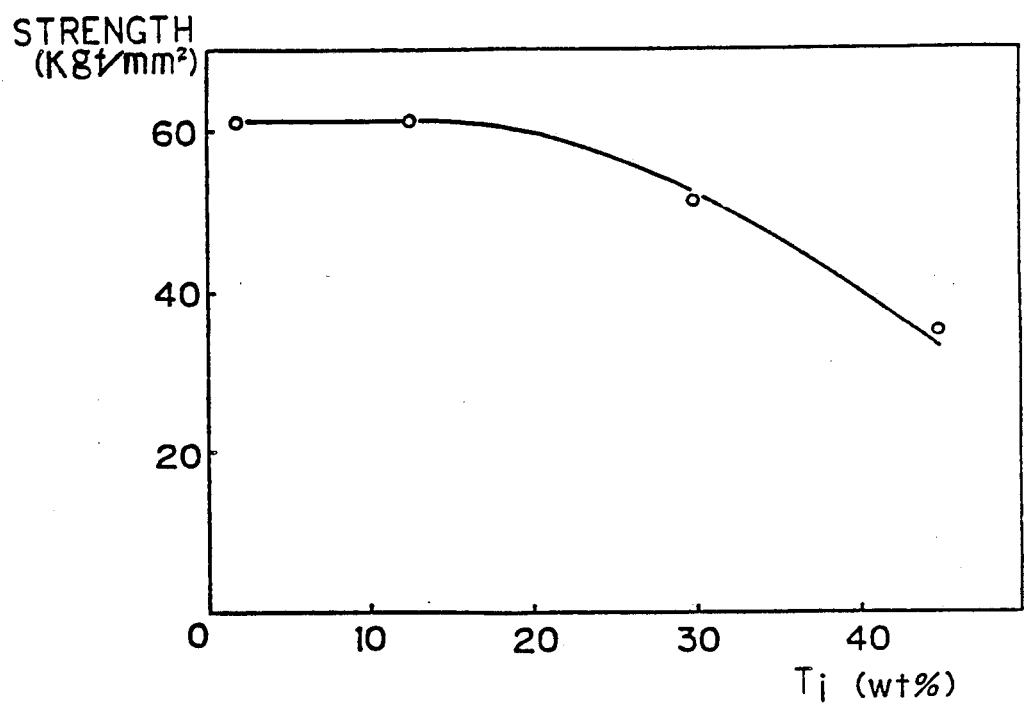
FIG. 9 is a graph showing a joining strength of the integral structural member relative to various contents of titanium in a joining layer.

FIG. 9 shows the result of experimental measurement of the joining strength of the integral structural member A for various contents of titanium (Ti) in the joining layer by which the carbide alloy block 2 having a compound of 92.5 weight percent carbon tungsten (WC) and 7.5 weight percent cobalt (Co) and the sintered silicon block 1 are joined together. Apparent from FIG. 9, is that a sufficient joining strength is given by the use of the adjoining layer 3 whose titanium (Ti) content is less than 30 weight percent relative to the total weight thereof.

Figure 10:
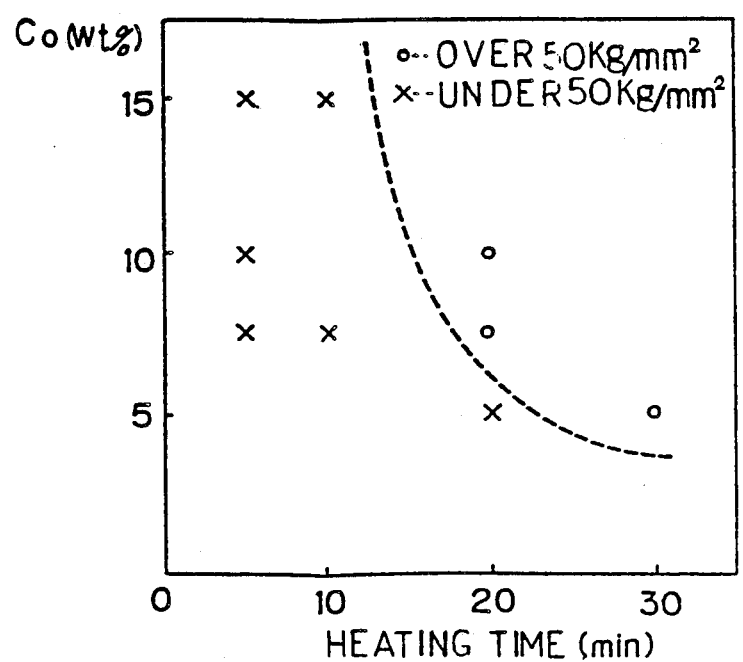
FIG. 10 is a distribution diagram of joining strength relative to heating time and content of cobalt in a carbide alloy of the joining layer.

FIG. 10 shows a graph of the results of experimental measurements of the joining strength of the complex structural member A for various contents of cobalt (Co) in carbide alloy block 2 relative to heating time. Used in these experimental measurements was a joining layer 3 which comprises a gold-copper (Au-Cu) alloy layer consisting of 50 weight percent gold (Au) and 50 weight percent copper and a layer of titanium (Ti) whose ratio in weight relative to the total weight of the joining layer 3 is approximately 10 percent and the integral structural member A was heated at 1025° C. For practical applications of the integral structural member A, an acceptable joining strength was determined higher than 50 kg/mm$^2$.

The results of these measurements showed clearly that it is sufficient to prolong the heating time in inverse proportion to the content of cobalt (Co) in order to provide a joining strength more than the acceptable joining strength and that a necessary content of cobalt is estimated to be more than 5 weight percent, desirably 7 weight percent.

EXAMPLE III

Figure 11:
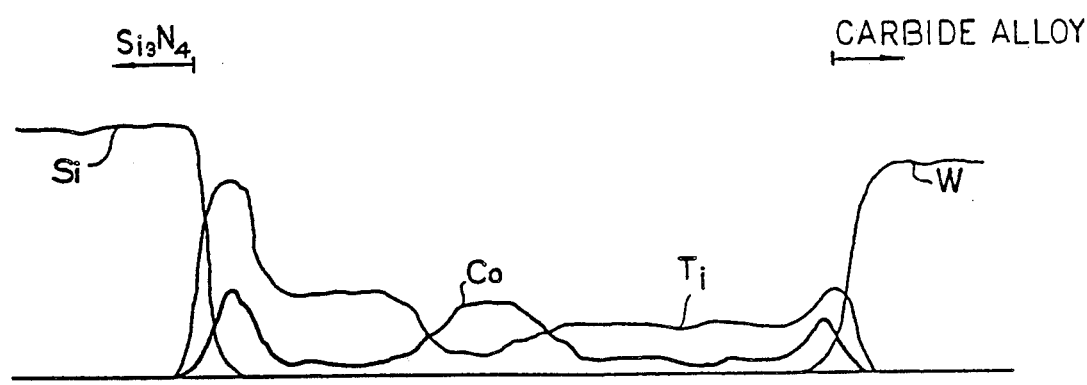
FIG. 11 is a diagram showing a distribution of titanium and cobalt resulting from a heating schedule according to still another preferred embodiment of the present invention.

To assess the joining strength of the integral structural member A having a different component joined according to the method of the present invention, another experimental measurement was conducted. In the other experimental measurement, a carbide alloy block 2 made of tungsten (W) was attached to the sintered silicon block 1 with the thin joining layer 3 consisting of a gold-copper (Au-Cu) alloy layer of 50 μm thickness which has equal parts in weight of gold (Au) and copper (Cu), a cobalt (Co) film layer of 10 μm thickness and a titanium (Ti) film layer of 20 μm thickness in order from the tungsten (W) block 2. The integral structural member A was heated at 1025° C. for 20 minutes after a preheating at 1000° C. for 10 minutes on the same heating schedule as in EXAMPLE I shown in FIG. 2. As a result of the four point bending test, the integral structural member A exhibited a joining strength of 54 kg/mm$^2$. Additionally, the result of EPMA line analysis was, as is shown in FIG. 11, that cobalt (Co) was somewhat unevenly distributed on the surface of the sintered silicon block 1.

Figure 12:
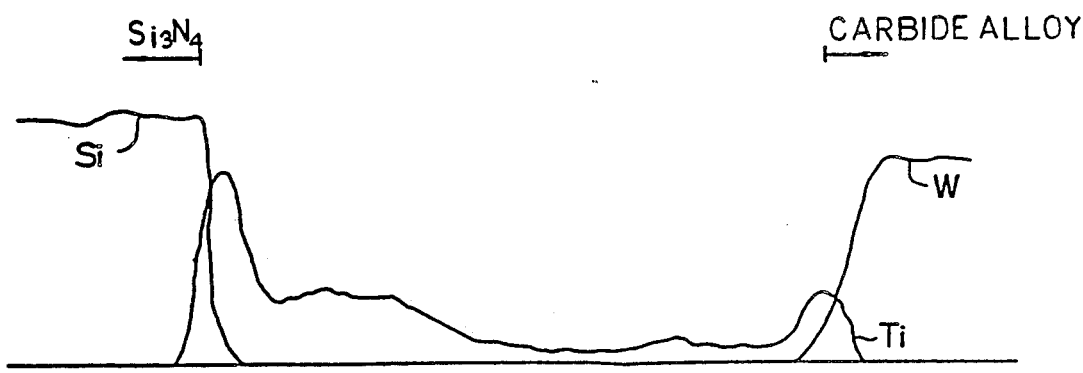
FIG. 12 is a diagram showing a distribution of titanium resulting from a heating schedule taken to be compared with the distribution of titanium of FIG. 11.

FIG. 12 shows the result of EPMA line analysis for the integral structural member A made up of the same blocks 1 and 2 as in EXAMPLE III which was, however, connected with a joining layer 3 consisting of a gold-copper (Au-Cu) alloy layer of 50 μm thickness which has equal parts in weight of gold (Au) and copper (Cu) and a titanium (Ti) film layer of 20 μm thickness in order from the tungsten (W) block 2. The integral structural member A was heated in the same manner as in EXAMPLE III. The integral structural member A exhibited a joining strength of 31 kg/mm$^2$.

Figure 13:
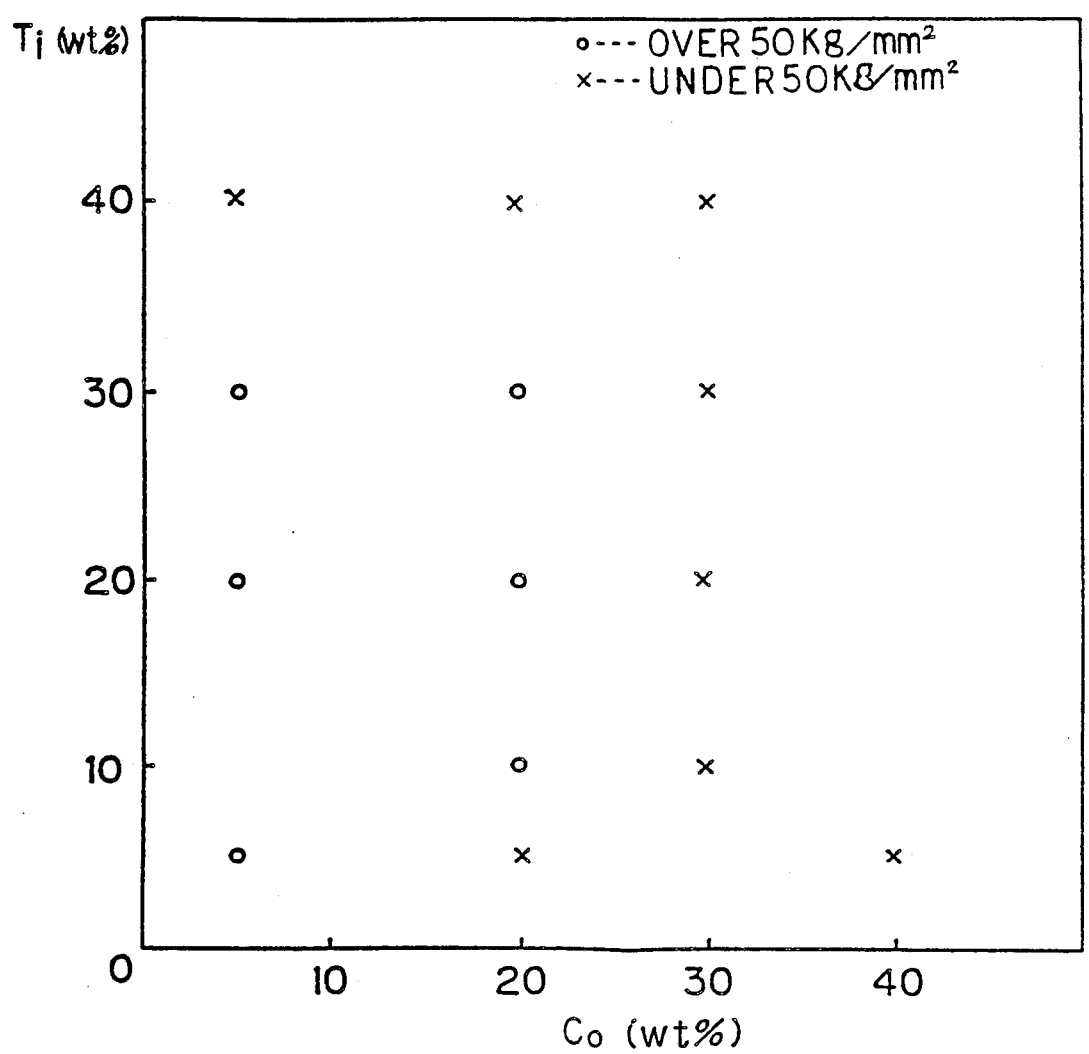
FIG. 13 is a distribution diagram of joining strength relative to contents of cobalt and titanium.

FIG. 13 shows the results of experimental measurements of joining strength for various weight ratios of both titanium (Ti) and copper (Cu) relative to the total weight of the gold-copper (Au-Cu) alloy. The results of these experimental measurements showed clearly that desirable contents of titanium (Ti) and cobalt (Co) were estimated less than 30 weight percent and 20 weight percent, respectively, in order to provide a joining strength more than the acceptable joining strength of 45 kg/mm$^2$.

A number of experimental measurements were run to find desirable conditions in which the joining method according to the present invention is applied and the results were shown in the following table wherein the abbreviation "JT" as used shall refer to the joining strength of the integral structural member.

| Temp. (°C.) | Time (Min.) | Load (g/cm$^2$) | Au-Cu(μm) | Ti(μm) | JT(kg/mm$^2$) |
| --- | --- | --- | --- | --- | --- |
| 990 | 5 | 50 | 50 | 20 | 47 |
| 990 | 5 | 150 | 100 | 50 | 0 |

-continued

| Temp. (°C.) | Time (Min.) | Load (g/cm$^2$) | Au-Cu(μm) | Ti(μm) | JT(kg/mm$^2$) |
| --- | --- | --- | --- | --- | --- |
| 990 | 20 | 50 | 50 | 50 | 18 |
| 990 | 20 | 150 | 100 | 20 | 55 |
| 1025 | 5 | 50 | 100 | 20 | 53 |
| 1025 | 5 | 150 | 50 | 50 | 0 |
| 1025 | 20 | 50 | 100 | 50 | 38 |
| 1025 | 20 | 150 | 50 | 20 | 63 |
| 1000 | 20 | 150 | 50 | 20 | 60 |
| 950 | 20 | 150 | 50 | 20 | 0 |

Although the present invention has been fully described by way of the preferred embodiments thereof with reference to the accompanying drawings, it is to be noted that various changes and modifications are apparent to those skilled in the art. Therefore, unless otherwise such changes and modifications depart from the true spirit and scope of the present invention, they should be construed as being included therein.

What is claimed is:

1. A method of joining together a silicon nitride member and a carbide alloy member having at least a content of 5 weight percent cobalt, said method comprising the steps of:
    interposing a joining layer containing a gold-copper alloy and titanium of less than 30 weight percent relative to a total weight of said joining layer between said silicon nitride and carbide alloy members; and
    heating said silicon nitride and carbide alloy members with said joining layer put therebetween at a preselected heating temperature for a predetermined heating time period.

2. A method as defined in claim 1, further comprising preheating said silicon nitride and carbide alloy members with said joining layer put therebetween at a preheating temperature lower than said preselected heating temperature for a predetermined preheating time period.

3. A method as defined in claim 1, wherein said silicon nitride and carbide alloy members with said joining layer put therebetween is heated at a temperature higher than approximately 1000° C. under a vacuum.

4. A method as defined in claim 1, wherein said silicon nitride and carbide alloy members with said joining layer put therebetween is heated under a vacuum of about 10$^{-2}$ to 10$^{-5}$ Torr.

5. A method as defined in claim 1, wherein said silicon nitride and carbide alloy members with said joining layer put therebetween is heated in a reducing atmosphere.

6. A method as defined in claim 5, wherein said reducing atmosphere is H$_2$ gas.

7. A method of joining together silicon nitride and carbide alloy members having at least a content of 5 weight percent cobalt, said method comprising the steps of:
    interposing a joining layer containing a gold-copper alloy and 1 to 30 weight percent titanium relative to a total weight of said joining layer between said silicon nitride and carbide alloy members; and
    heating said silicon nitride and carbide alloy members with said joining layer put therebetween at a temperature higher than approximately 1000° C. for a predetermined heating time period.

8. A method as defined in claim 7, further comprising preheating said silicon nitride and carbide alloy members with said joining layer put therebetween at a preselected preheating temperature lower than said preselected heating temperature for a predetermined preheating time period.

9. A method as defined in claim 7, wherein said silicon nitride and carbide alloy members with said joining layer put therebetween is heated under a vacuum of about $10^{-2}$ to $10^{-5}$ Torr.

10. A method as defined in claim 7, wherein said silicon nitride and carbide alloy members are heated in a reducing atmosphere.

11. A method as defined in claim 10, wherein said reducing atmosphere is $H_2$ gas.

12. A method as defined in claim 7, wherein a content of said titanium is 10 to 30 weight percent.

13. A method of joining silicon nitride and metal members comprising the steps of:
   interposing a joining layer containing a gold-copper alloy, 1 to 30 weight percent titanium and 5 to 20 weight percent cobalt relative to the total weight of said joining layer between said silicon nitride and metal members; and
   heating said silicon nitride and metal members with said joining layer at a preselected heating temperature for a predetermined heating time period.

14. A method as defined in claim 13, wherein a content of said titanium is 10 to 30 weight percent.

15. A method as defined in claim 13, wherein a content of said cobalt is 7 to 20 weight percent.

16. A method as defined in claim 13, further comprising preheating said silicon nitride and metal members with said joining layer put therebetween at a preheating temperature lower than said preselected heating temperature for a predetermined preheating time period.

17. A method as defined in claim 13, wherein said silicon nitride and metal members with said joining layer put therebetween is heated at a heating temperature higher than approximately 1000° C.

18. A method as defined in claim 13, wherein said silicon nitride and metal members with said joining layer put therebetween is heated under a vacuum of about $10^{-2}$ to $10^{-5}$ Torr.

19. A method as defined in claim 13, wherein said silicon nitride and metal members is heated in a reducing atmosphere.

20. A method as defined in claim 19, wherein said reducing atmosphere is $H_2$ gas.

21. An integral structural member made of two different members, comprising:
   a silicon nitride member;
   a carbide alloy member containing at least 5 weight percent of cobalt (Co) joined to said silicon nitride member;
   a joining member in the form of a thin layer interposed between said silicon nitride and carbide alloy members, said joining member consisting a gold-copper alloy and less than 30 weight percent of titanium relative to a total weight of said joining member and having been heated at more than 1000° C. to melt and form at least a cobalt intermetallic compound.

22. An integral structural member as defined in claim 21, wherein said joining layer has a content of 10 to 30 weight percent of titanium.

23. An integral structural member as defined in claim 21, wherein said integral structural member has been heated under a vacuum of about $10^{-2}$ to $10^{-5}$ Torr.

24. An integral structural member as defined in claim 21, wherein said integral structural member has been heated in a reducing atmosphere.

25. An integral structural member as defined in claim 24 wherein said reducing atmosphere is $H_2$ gas.

26. An integral structural member made of two different members, comprising:
   a silicon nitride member;
   a metal member joined together to said silicon nitride member; and
   a joining member in a form of a thin layer consisting a gold-copper alloy, 1 to 30 weight percent of titanium and 5 to 20 weight percent of cobalt relative to the total weight of said joining member, said joining member having been heated at more than 1000° C. to melt and form at least a cobalt intermetallic compound.

27. An integral structural member as defined in claim 26, wherein a content of said titanium is 10 to 30 weight percent.

28. An integral structural member as defined in claim 26, wherein a content of said cobalt is 7 weight percent.

29. An integral structural member as defined in claim 26, wherein said integral structural member has been heated under a vacuum of about $10^{-2}$ to $10^{-5}$ Torr.

30. An integral structural member as defined in claim 26, wherein said integral structural member has been heated in a reducing atmosphere.

31. An integral structural member as defined in claim 30, wherein said reducing atmosphere is $H_2$ gas.

* * * * *